United States Patent
Rowlan (10) Patent No.: US 7,093,070 B2
(45) Date of Patent: Aug. 15, 2006

(54) METHOD AND SYSTEM FOR SELECTIVELY RECORDING SYSTEM INFORMATION

(75) Inventor: Stacey R. Rowlan, Phoenix, AZ (US)

(73) Assignee: Aviation Communication & Surveillance Systems, LLC, Phoenix, AZ (US)

( * ) Notice: Subject to any disclaimer, the term of this patent is extended or adjusted under 35 U.S.C. 154(b) by 244 days.

(21) Appl. No.: 10/612,367

(22) Filed: Jul. 1, 2003

(65) Prior Publication Data
US 2005/0005065 A1    Jan. 6, 2005

(51) Int. Cl.
*G06F 12/00*    (2006.01)

(52) U.S. Cl. .................. 711/115; 711/100; 711/103; 711/221; 340/3.41; 701/35; 701/301; 342/29; 702/187; 73/1.78

(58) Field of Classification Search ............... 711/115, 711/103, 100, 221; 340/3.41; 701/301, 701/35; 702/187; 342/29; 73/1.78
See application file for complete search history.

(56) References Cited

U.S. PATENT DOCUMENTS

| | | | | |
|---|---|---|---|---|
| 5,157,615 | A * | 10/1992 | Brodegard et al. | 701/301 |
| 5,388,047 | A * | 2/1995 | Ryan et al. | 701/301 |
| 5,864,307 | A * | 1/1999 | Henley | 340/964 |
| 6,278,913 | B1 * | 8/2001 | Jiang | 701/3 |
| 6,456,940 | B1 * | 9/2002 | Higgins | 701/301 |
| 6,768,943 | B1 * | 7/2004 | Pearson | 701/301 |
| 2003/0152145 | A1 * | 8/2003 | Kawakita | 375/240.12 |
| 2004/0068372 | A1 * | 4/2004 | Ybarra et al. | 701/301 |

OTHER PUBLICATIONS

Web page publication, "CompactFlash Info" at http://www.compactflash.org/info/cfinfo.htm printed Aug. 7, 2005.*
Mark 33 Digital Information Transfer System (DITS), Part 1, Functional Description, Electrical Interface, Label Assignments and Word Formats, ARINC Specification 429P1-15, Sep. 1, 1995.
Mark 33 Digital Information Transfer System (DITS), Part 2, Discrete Word Data Standards, ARINC Specification 429P2-15, Mar. 6, 1996.
Mark 33 Digital Information Transfer System (DITS), Part 3, File Data Transfer Techniques, ARINC Specification 429P3-16, Jul. 15, 1997.

* cited by examiner

*Primary Examiner*—Stephen C. Elmore
(74) *Attorney, Agent, or Firm*—Allen J. Moss; Squire, Sanders & Dempsey L.L.P.

(57) ABSTRACT

A method and apparatus for recording data concerning a system is provided. The apparatus comprises a memory card, such as a COMPACTFLASH card, and a processor unit, such as a $T^2CAS$ processor unit. The memory card includes a supplemental file that contains instructions as to what data is to be recorded and when the recording should start and stop. To conserve space the supplemental file is written as a sequence of hexadecimal characters whose position in the sequence and binary bit value indicates which data is to be recorded and when. A lookup table can be used to interpret the supplemental file. The processor unit includes or is coupled to a memory card reader/writer.

35 Claims, 6 Drawing Sheets

METHOD AND SYSTEM FOR SELECTIVELY RECORDING SYSTEM INFORMATION

TECHNICAL FIELD

This invention relates to configuring and storing data and more particularly to a method and system for recording system information.

BACKGROUND OF THE INVENTION

Complex machines, such as commercial and military aircraft, at times need to have various systems tested to ensure the machine is operating properly. For example, it is often necessary to test these machines under operating conditions and record data from these tests. When testing various systems of a complex machine, it is convenient to record data from certain inputs or outputs in order to obtain a record of system parameters. It is often of interest to start and stop the recording of certain inputs and outputs based on the condition of a system. For example, when testing systems on an aircraft, certain parameters indicative of the aircraft performance or the performance of a system might be of interest to record when the aircraft is operating between certain altitudes or at certain airspeed. However, current methods of recording such data have been limited.

Traditionally, to record information such as that generated by an aircraft and its various systems, bulky data recorders are attached to a serial output of a processor unit associated with the system and data is recorded. The use of this type of data recorder has several drawbacks. First, the data recorders are large and expensive. Also, the data recorders typically record all the signals from a given input or output, or all data from all inputs and output. There is no way to tell the system what data should be recorded and when recording should take place. This leads to the storage of unnecessary information and wasting of space on the recording medium. The bulky recorders are also not very portable and are not a convenient way to carry the data.

Therefore, a need has arisen for a recording method that both utilizes a recording medium that is compact and convenient to use a carry, but that also provides a way to easily specify what data is to be recorded and under what condition the recording should take place. The specification of what data to record and when to record the data should be done in such a way as to be easily changed by the user to record other data of interest. Therefore, what is needed is a method and system for recording system information.

SUMMARY OF THE INVENTION

Therefore a need has arisen for a method and system for recording system information.

In one embodiment, a memory card for storing test data is disclosed. The memory card includes a supplemental file section that stores a supplemental file. The supplemental file includes instructions indicating the data to be recorded and/or when to record the data. The memory card also includes a file storage area for storing data based on the instructions in the supplemental file. The supplemental file of the memory card may include a plurality of hexadecimal characters. In this embodiment, the system reads the position and bit value of the hexadecimal character and determines the data to be recorded. Additionally, the supplemental file of the memory also contains instructions for starting and stopping recording data when certain predefined conditions are met.

In another embodiment, an apparatus for recording information about a system is disclosed. Included is a memory card. The memory card includes a supplemental file and a file storage section. Also included is a processor unit designed to read from and write to the memory card. The supplemental file includes instructions for the processor that tells the processor what information to save to the file storage section.

In another embodiment, a method for recording data concerning a system is disclosed. The method includes a step of storing a supplemental file on a memory device. The supplemental file contains instructions indicating the data to record. Next, the memory device is coupled to a processor unit. The processor unit reads the supplemental file and stores the data to the memory device.

Technical benefits of the present invention include that only specified data is stored. This includes the ability to specify parameters to start and stop the recording of data. Other technical benefits are apparent from the following descriptions, illustrations and claims.

BRIEF DESCRIPTION OF THE DRAWINGS

Non-limiting and non-exhaustive preferred embodiments of the present invention are described with references to the following figures wherein like reference numerals refer to like parts throughout the various views unless otherwise specified.

DETAILED DESCRIPTION OF THE PREFERRED EMBODIMENTS

A flash configurable memory, according to various aspects of the present invention, stores a supplemental file. The supplemental file specifies which parameters of a system are to be recorded and under what conditions to record the data to a solid-state memory card. Parameters include, among other things, specific bus inputs/outputs on a communication bus. The present invention also provides a way to specify under what conditions to record data. Conditions may include aircraft altitude, aircraft status and the like.

A system for recording information regarding a system, according to various aspects of the present invention, generally includes a processor unit for monitoring inputs and outputs. Additionally, a memory card reader and writer receives data from the processor unit and records the data. The memory card may include a supplemental file that specifies which inputs and outputs to record from and when to record the data from the inputs and outputs.

Figure 1:
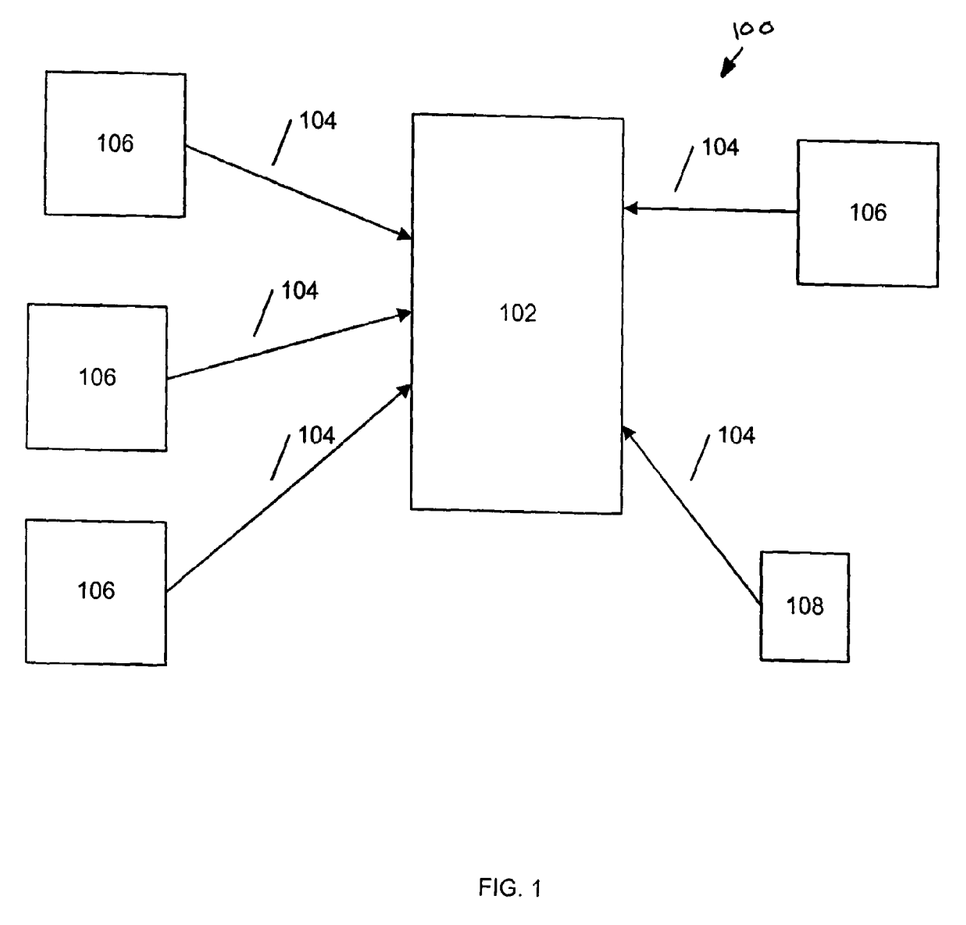
FIG. 1 illustrates a data recording system for monitoring and recording data concerning another system or subsystem.

For example, FIG. 1 illustrates a processing system 100 where data concerning this system or another system or subsystem may be monitored and recorded. System 100 includes a central processor unit 102. Central processor unit 102 sends data to and receives data from one or more subsystem processor units 106 via input/output lines 104. Processor unit 102 also processes data it receives. A memory card 108 is coupled to processing unit 102 via a reader/writer (not pictured) that can be directly incorporated as part of processor unit 102 or attached to processor unit 102 via a line such as a serial communication line.

Processing system 100 can be any system for monitoring another system and the environment of that system. For example, system 100 may be used in a factory. In this example, central processing unit 102 may receive information regarding plant parameters from individual subsystem processor units 106. In another embodiment processing system 100 may be installed in an aircraft as part of an aircraft traffic and terrain collision avoidance system. The embodiment where system 100 is an aircraft traffic and terrain collision avoidance system will be discussed in greater detail in conjunction with FIG. 2.

Central processor unit 102 receives and processes information received from subsystem processor units 106. Central processor unit 102 can also send information to subsystem processing units 106.

Subsystem processor unit 106 may be any device capable of receiving or detecting information such as a temperature sensor, an altimeter and the like. Subsystem process unit 106 may also process data detected or received to produce additional data that can then be sent to the central processor unit 102.

Input/output connection 104 is any connection between central processor unit 102 and subsystem processor units 106 that is capable of transmitting data, either wired or wireless.

Memory card 108 is any solid state memory device capable of storing information including a memory card, such as the COMPACTFLASH card first developed by the SanDisk Corporation of Santa Clara Calif., a memory card, such as the SMART MEDIA card manufactured by Toshiba Corporation, a memory device, such as the MEMORY STICK manufactured by Sony Corporation, a memory card, such as the MULTIMEDIA CARD developed jointly by SanDisk and Siemens, a PCMCIA compatible memory card, or any other solid state device capable of storing information. Solid-state memory cards are advantageous for storing data because they are easily transportable, shock resistant and can go through numerous read/write cycles. Additionally, solid-state memory cards typically do not require batteries to retain their memory when stored. Memory card 108 may also be a portable magnetic storage device such as a portable hard drive like the MICRODRIVE hard drive by International Business Machines of Armark, N.Y. Memory card 108 is either inserted into a reader/writer in central processor unit 102 or attached to a read/write device coupled to central processor unit 102. Once inserted, memory card 108 records data detected by or generated within processing system 100. Memory card 108 may also include a file that specifies which input/output to record and/or under what conditions to record the inputs. In one embodiment, memory card 108 is a 256 MB compact flash card, although other size memory cards using other formats can also be substituted without departing from the scope of the present invention.

In operation, central processor unit 102 receives data from one or more subsystem processor units 106. Central processor unit 102 may also generate data based on received information. All or part of this information can be saved to memory card 108. The data stored on memory card 108 can then be used to analyze the system being monitored.

Figure 2:
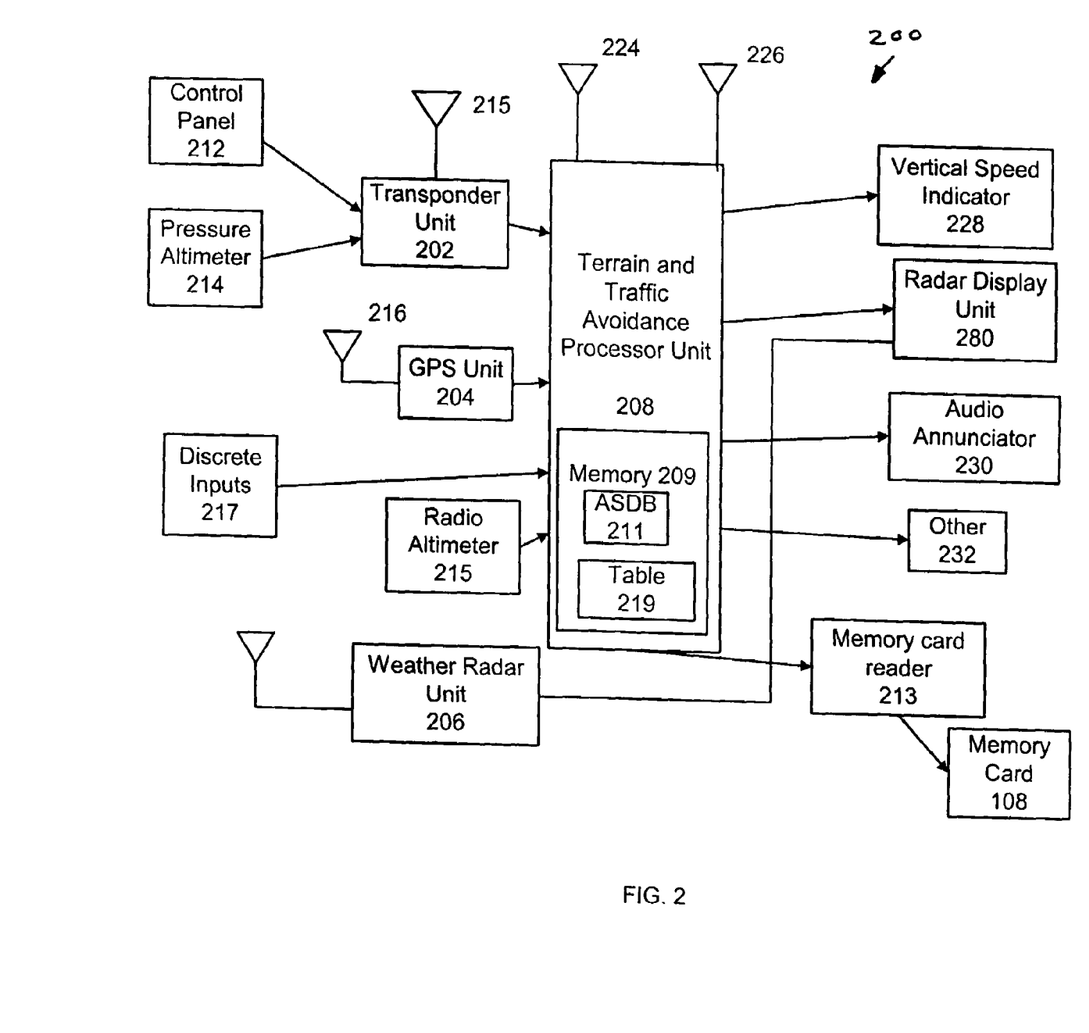
FIG. 2 is a block diagram of an avionic implementation of the present invention.

FIG. 2 is a block diagram of an avionic embodiment of the present invention. Illustrated are major components of an air traffic and terrain collision avoidance system 200 (referred to as T2CAS as manufactured by ACSS of Phoenix, Ariz.). System 200 can be used for navigation, flight management, mission command, communication and control, and/or air traffic collision avoidance. In the discussions below, the present invention can be used in any collision avoidance system with or without terrain avoidance capabilities. System 200 comprises a terrain and traffic collision avoidance processor 208, transponder unit 202, GPS unit 204, radio altimeter 216 and memory card reader 213.

System 200 includes a terrain and traffic collision avoidance processor unit 208. Terrain and traffic collision avoidance processor unit 208 receives data from various subsystems described below and determines the portion of the aircraft it is monitoring in relation to other aircrafts and terrain. The terrain and traffic avoidance processor unit 208 can also output data to other output devices, such as a display. Terrain and traffic avoidance processor unit 208 may include a memory 209. Memory 209 stores information regarding the configuration of the aircraft such as what are the inputs and outputs to the terrain and traffic avoidance processor unit 208. This information is stored as and aircraft specific database (ASDB) 211. Components of system 200 are typically connected to terrain and traffic avoidance processor unit 208 via wires such as a twisted pair of wires that transmits digital data. In one embodiment the digital data is transmitted as specified in Aeronautical Radio, Inc. (ARINC) Standard ARNIC-429 "Mark 33 Digital Information Transfer System (DITS)—Parts 1, 2, and 3" hereby incorporated in its entirety by reference. Other components transmit analog data, which can be recorded in a digital format. For example, radio altimeter 215 may be an analog device that outputs a voltage that corresponds to the altitude. There are also discrete analog inputs 217 that output one of two values such as circuit open or closed. An example of a discrete input is the landing gear position, which is either in the up or down position.

In one embodiment, transponder unit 202 is a mode-S transponder such as the XS-950 mode transponders manufactured by ACSS of Phoenix, Ariz. Transponder 202 includes an omni-directional antenna 215 for transmitting/receiving information to/from other aircraft or air traffic control ground stations. Transponder unit 202 receives inputs from the central panel 212 of the aircraft as well as from a pressure altimeter 214. Transponder unit 202 may be any device or combination of devices capable to receive communications known as interrogations from another aircraft or air traffic control ground station and respond to these interrogations. The replies to these interrogations may include the position of the aircraft and its identification.

Global positioning system (GPS) receiver 204 is also coupled to processor unit 208. GPS receiver 204 may be any device or devices that can provide navigational data to processor unit 208 through the reception of locational signals. GPS receiver 204 receives locational signals, via GPS antenna 216.

Radio altimeter 215 is also coupled to processor unit 208. Radio altimeter 215 is used to determine the altitude of the aircraft using radio waves reflected from the ground.

Memory card 108 is coupled to terrain and traffic collision avoidance processor unit 208 via a memory card reader/writer 213 in such a way as to be able to receive and record data sent to, sent from and/or processed by the terrain and traffic collision avoidance processor unit 208. Memory card 108 can also record parameters internal to the T$^2$CAS such as the status of internal counter such as those that track how long software has been running. In one embodiment, processor unit 208 has a slot containing a reader/writer unit 213 that accepts memory card 108 for read/write operation. In another embodiment a reader/writer unit 213 is located remotely from the processor unit 208 but is in communication with the processor unit 208. Memory card 108 may record data inputs to the processor unit 208, data outputs of the processor unit 208, and data created within the processor unit 208. Memory card 108 may record digital or analog data onto the memory card 108 in a digital form.

Vertical speed display 228 is coupled to and receives data from processor unit 208. Vertical speed display 228 indicates the speed of the aircraft as vertical speed in feet per minute. Vertical speed display 228 can also be used as a vertical speed indicator/traffic advisory and resolution advisory screen, which provides both vertical speed and indication of the aircraft position in reference to other aircraft. The output to vertical speed display 228 is typically a wired output such as those specified by ARINC-429.

Radar display 280 is coupled to the processor unit 208 and is capable of displaying other aircraft location. Radar display 280 can also display terrain data in an aircraft capable of displaying this information. Radar display 280 can also couple to weather radar unit 206 to receive and display weather data. Audio annunciator 230 receives outputs from the processor unit 208 in order to provide audio advisories to the pilot of the aircraft. Other outputs 232 to the processor units also exist to support various subsystems.

In operation, memory card 108 is used in testing to record in-flight data. Memory card 108 is communicatively coupled to the processor unit 208 such as by insertion into a slot of memory card reader/writer 213 in the processor unit 208, which connects the memory card 108 for reading and writing operations. Other methods of coupling memory card 108 to processing unit 208 can be used. Memory card 108 can receive data from any input of processor unit 208, any output of processor unit 208, as well as data generated internal to processor unit 208. Memory card 108 may contain a supplemental file that is read before data storage to indicate what data is recorded to the memory card.

Figure 3:
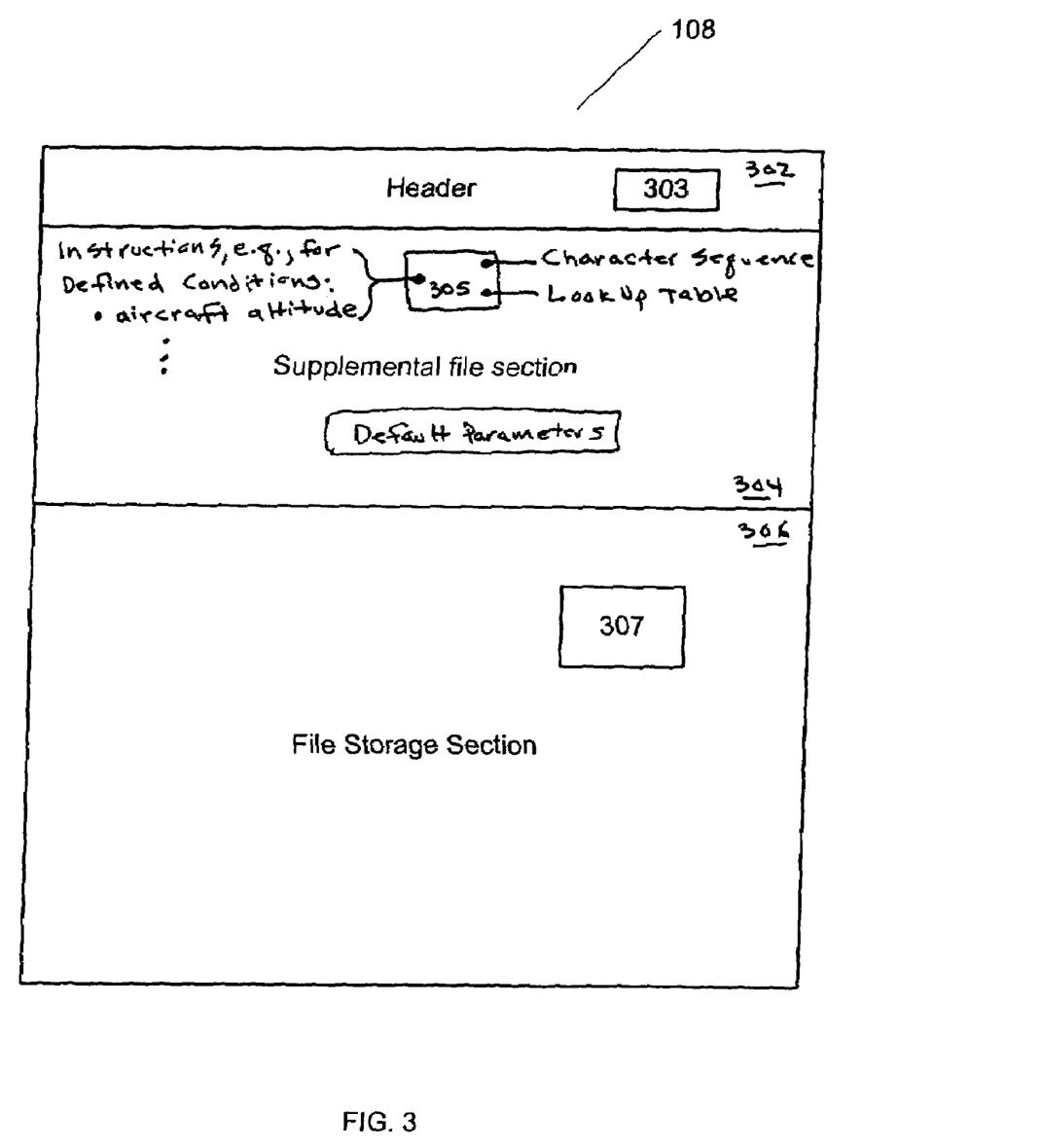
FIG. 3 illustrates an exemplary memory card.

FIG. 3 is a block diagram of the structure of an exemplary memory card 108. Memory card 108 includes a header section 302, a supplemental file storage area 304 that stores a supplemental file 305 and a data storage area 306. The header section 302 may contain a configuration file 303. If processor unit 208 detects the presence of the configuration file 303, data recording is enabled. The configuration file 303 indicates whether there is a supplemental file 305. If the configuration file 303 indicates there is not a supplemental file 305, all data parameters defined by an aircraft specific database (ASDB) 211 are continuously recorded to memory card 108. The ASDB 211 is a database specific to each aircraft that specifies, among other things, the configuration of various aircraft parameters including the assignment of each input and output of the processor unit 208. The ASDB 211 is stored in memory 209 at the processor unit 208. If the configuration file 303 indicates the presence of a supplemental file 305, processor unit 208 reads supplemental file 305, which is stored in supplemental file storage area 304. The supplemental file 305 contains instructions that are read and interpreted by processor unit 208. These instructions indicate what parameters are to be recorded to memory card 108 and stored in the data storage area 306. If there is no supplemental file, then all data generated by, sent to or sent from processor unit 208 is recorded. Alternatively, if there is no supplemental file, a default set of data is recorded. The default set of data can be chosen ahead of time and could be based on the typical data needed by maintenance workers, the typically data needed by a supplier to evaluate the suppliers component or any other predetermined set of data. The ASDB 211 can store which parameters of the system comprise the default data.

In an alternative embodiment, the supplemental file maybe sent over a parallel or serial connection directly to processor unit 208 without it being read from a memory card. For example, the supplemental file may be sent over an Ethernet or RS-232 connection to processor unit 208. The processor unit reads the supplemental file and outputs the data to be recorded based on the supplemental file. The data can be sent back over the same Ethernet or RS-232 to a computer (such as a laptop) for recording on a hard drive, optical drive, or solid-state memory card coupled to the computer. Alternatively, the data can be sent to card reader 213 for recording on a memory card 108.

Figure 4:
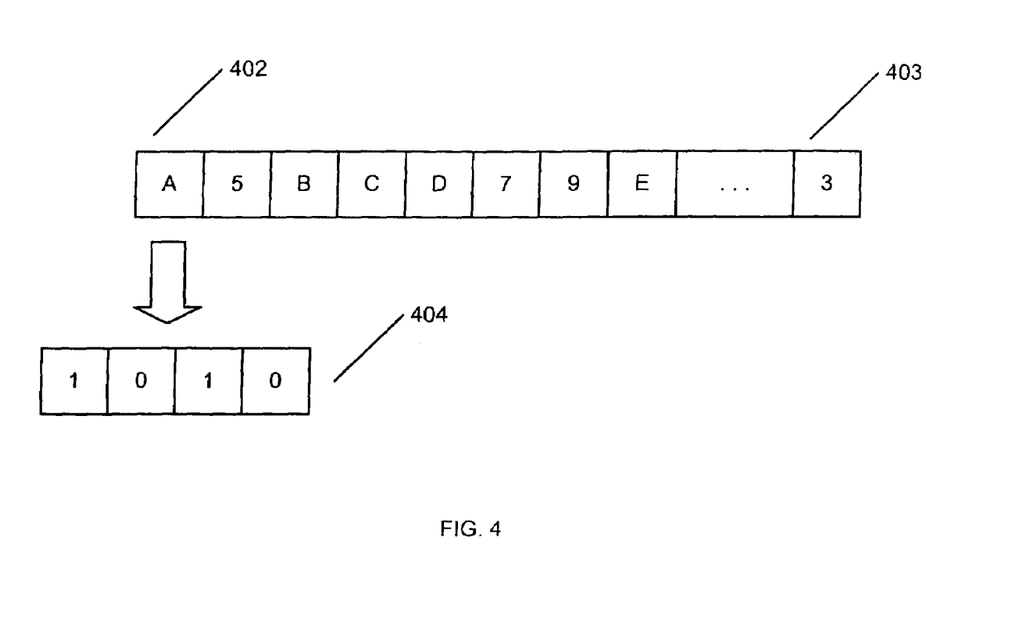
FIG. 4 illustrates the format of the supplemental file.

In one embodiment, supplemental file 305 comprises a series of hexadecimal characters with each character representing a hexadecimal value between zero and F. A hexadecimal value between zero and F represents a decimal value between zero and 15. Referring to FIG. 4, the hexadecimal characters are placed in order from a first position 402 all the way to the last position 403. Each hexadecimal character can also be expressed as a binary value having at most four bits. The binary value has at most four bits because the greatest four bit binary number, 1111, is equal to 15 in decimal or F in hexadecimal, which is the largest hexadecimal value. For example, the hexadecimal value "A" is equivalent to the decimal value 10 and the binary value 1010 as represented by label 404. The binary value 1010, as represented by label 404, has a one in the first position which is also known as the most significant bit, a zero in the second position, a one in the third position, and a zero in the fourth position where the fourth position is known as the least significant bit. In the present invention, the position of the hexadecimal character in a series of hexadecimal characters and the value of each of the bit numbers for the equivalent binary numbers for that hexadecimal character, tells the processing unit 102 what data to record. The hexadecimal character and the binary equivalent are used in conjunction with a decoder table 219, which, in one embodiment, is stored at the processor unit 208 in conjunction with the aircraft specific database 211 to set what data is recorded and from where the data is recorded. An exemplary decoder table 219, which correlates the assignment of hexadecimal characters and the associated bit numbers to the actual inputs and outputs to record and when to record, is shown in Table 1, below. In the table "RX" means to enable recording. Enabling recording enables the recording of all the data that is received by the input or the output while filtering records only parameters defined by the ASDB, which among other things, assigns each ARINC 429 input to specific devices.

TABLE 1

Flight Recording Supplemental File Character Definition

| Character | Bit Number | Name | Definition |
|---|---|---|---|
| 1 | 1 | Spare | |
| 1 | 2 | Spare | |
| 1 | 3 | Spare | |

TABLE 1-continued

Flight Recording Supplemental File Character Definition

| Character | Bit Number | Name | Definition |
|---|---|---|---|
| 1 | 4 | Spare | |
| 2 | 1 | FILTER RX 1 | Enables recording of ARINC 429 Input #1 data |
| 2 | 2 | FILTER ASDB RX 1 | Enables filtering in accordance with ASDB parameters of ARINC 429 Input #1 data |
| 2 | 3 | FILTER RX 2 | Enables recording of ARINC 429 Input #2 data |
| 2 | 4 | FILTER ASDB RX 2 | Enables filtering in accordance with ASDB parameters of ARINC 429 Input #2 data |
| 3 | 1 | FILTER RX 3 | Enables recording of ARINC 429 Input #3 data |
| 3 | 2 | FILTER ASDB RX 3 | Enables filtering in accordance with ASDB parameters of ARINC 429 Input #3 data |
| 3 | 3 | FILTER RX 4 | Enables recording of ARINC 429 Input #4 data |
| 3 | 4 | FILTER ASDB RX 4 | Enables filtering in accordance with ASDB parameters of ARINC 429 Input #4 data |
| 4 | 1 | FILTER RX 5 | Enables recording of ARINC 429 Input #5 data |
| 4 | 2 | FILTER ASDB RX 5 | Enables filtering in accordance with ASDB parameters of ARINC 429 Input #5 data |
| 4 | 3 | FILTER RX 6 | Enables recording of ARINC 429 Input #6 data |
| 4 | 4 | FILTER ASDB RX 6 | Enables filtering in accordance with ASDB parameters of ARINC 429 Input #6 data |
| 5 | 1 | FILTER RX 7 | Enables recording of ARINC 429 Input #7 data |
| 5 | 2 | FILTER ASDB RX 7 | Enables filtering in accordance with ASDB parameters of ARINC 429 Input #7 data |
| 5 | 3 | FILTER RX 8 | Enables recording of ARINC 429 Input #8 data |
| 5 | 4 | FILTER ASDB RX 8 | Enables filtering in accordance with ASDB parameters of ARINC 429 Input #8 data |
| 6 | 1 | FILTER RX 9 | Enables recording of ARINC 429 Input #9 data |
| 6 | 2 | FILTER ASDB RX 9 | Enables filtering in accordance with ASDB parameters of ARINC 429 Input #9 data |
| 6 | 3 | FILTER RX 10 | Enables recording of ARINC 429 Input #10 data |
| 6 | 4 | FILTER ASDB RX 10 | Enables filtering in accordance with ASDB parameters of ARINC 429 Input #10 data |
| 7 | 1 | FILTER RX 11 | Enables recording of ARINC 429 Input #11 data |
| 7 | 2 | FILTER ASDB RX 11 | Enables filtering in accordance with ASDB parameters of ARINC 429 Input #11 data |
| 7 | 3 | FILTER RX 12 | Enables recording of ARINC 429 Input #12 data |
| 7 | 4 | FILTER ASDB RX 12 | Enables filtering in accordance with ASDB parameters of ARINC 429 Input #12 data |
| 8 | 1 | FILTER RX 13 | Enables recording of ARINC 429 Input #13 data |
| 8 | 2 | FILTER ASDB RX 13 | Enables filtering in accordance with ASDB parameters of ARINC 429 Input #13 data |
| 8 | 3 | FILTER RX 14 | Enables recording of ARINC 429 Input #14 data |
| 8 | 4 | FILTER ASDB RX 14 | Enables filtering in accordance with ASDB parameters of ARINC 429 Input #14 data |
| 9 | 1 | FILTER RX 15 | Enables recording of ARINC 429 Input #15 data |
| 9 | 2 | FILTER ASDB RX 15 | Enables filtering in accordance with ASDB parameters of ARINC 429 Input #15 data |
| 9 | 3 | FILTER RX 16 | Enables recording of ARINC 429 Input #16 data |
| 9 | 4 | FILTER ASDB RX 16 | Enables filtering in accordance with ASDB parameters of ARINC 429 Input #16 data |
| 10 | 1 | FILTER RX 17 | Enables recording of ARINC 429 Input #17 data |
| 10 | 2 | FILTER ASDB RX 17 | Enables filtering in accordance with ASDB parameters of ARINC 429 Input #17 data |
| 10 | 3 | FILTER RX 18 | Enables recording of ARINC 429 Input #18 data |
| 10 | 4 | FILTER ASDB RX 18 | Enables filtering in accordance with ASDB parameters of ARINC 429 Input #18 data |
| 11 | 1 | FILTER AI | Enables recording of all Analog Input Data |

TABLE 1-continued

Flight Recording Supplemental File Character Definition

| Character | Bit Number | Name | Definition |
|---|---|---|---|
| 11 | 2 | FILTER GCAM | Enables recording of GCAM data |
| 11 | 3 | FILTER T$^2$CAS | Enables recording of T$^2$CAS data |
| 11 | 4 | Spare | |
| 12 | 1 | FILTER TX 1 | Enables recording of ARINC 429 Output #1 data |
| 12 | 2 | FILTER TX 2 | Enables recording of ARINC 429 Output #2 data |
| 12 | 3 | FILTER TX 3 | Enables recording of ARINC 429 Output #3 data |
| 12 | 4 | FILTER TX 4 | Enables recording of ARINC 429 Output #4 data |
| 13 | 1 | FILTER DI | Enables recording of all Discrete Input Data |
| 13 | 2 | FILTER DO | Enables recording of all Discrete Output Data |
| 13 | 3–4 | Spare | |
| 14–16 | 1–4 | Spare | |
| 17–24 | 1–4 | CONDITION 1 ADDRESS | Provides a 32-bit Data Parameter Address to Evaluate Condition 1 |
| 25 | 1–4 | CONDITION 1 TYPE | Type condition for contents of address: '1' indicates a 32-bit integer. '2' indicates a 32-bit floating point. '3' indicates a 64-bit integer. '4' indicates a 64-bit floating point. |
| 26 | 1–4 | LOGICAL TEST 1 | Test to be applied to contents of CONDITION 1 ADDRESS. '1' indicates an evaluation of the contents of CONDITION 1 ADDRESS > CONDITION 1 VALUE. '2' indicates an evaluation of the contents of CONDITION 1 ADDRESS ≧ CONDITION 1 VALUE. '3' indicates an evaluation of the contents of CONDITION 1 ADDRESS = CONDITION 1 VALUE. '4' indicates an evaluation of the contents of CONDITION 1 ADDRESS ≠ CONDITION 1 VALUE. '5' indicates an evaluation of the contents of CONDITION 1 ADDRESS ≦ CONDITION 1 VALUE. '6' indicates an evaluation of the contents of CONDITION 1 ADDRESS < CONDITION 1 VALUE. |
| 27–28 | 1–4 | Spare | |
| 29–36 | 1–4 | CONDITION 1 VALUE #1 | The value to evaluate condition 1, for 64 bit type. |
| 37–44 | 1–4 | CONDITION 1 VALUE #2 | The value to evaluate condition 1 for 32 bit type, or the continuation of a 64 bit type value. |
| 45–52 | 1–4 | CONDITION 2 ADDRESS | Provides a 32-bit Data Parameter Address to Evaluate Condition 2 |
| 53 | 1–4 | CONDITION 2 TYPE | Type condition for contents of address: '1' indicates a 32-bit integer. '2' indicates a 32-bit floating point. '3' indicates a 64-bit integer. '4' indicates a 64-bit floating point. |
| 54 | 1–4 | LOGICAL TEST 2 | Test to be applied to contents of CONDITION 2 ADDRESS. '1' indicates an evaluation of the contents of CONDITION 2 ADDRESS > CONDITION 2 VALUE. '2' indicates an evaluation of the contents of CONDITION 2 ADDRESS ≧ CONDITION 2 VALUE. '3' indicates an evaluation of the contents of CONDITION 2 ADDRESS = CONDITION 2 VALUE. '4' indicates an evaluation of the contents of CONDITION 2 ADDRESS ≠ CONDITION 2 VALUE. '5' indicates an evaluation of the contents of CONDITION 2 ADDRESS ≦ CONDITION 2 VALUE. |

TABLE 1-continued

Flight Recording Supplemental File Character Definition

| Character | Bit Number | Name | Definition |
|---|---|---|---|
| | | | '6' indicates an evaluation of the contents of CONDITION 2 ADDRESS < CONDITION 2 VALUE. |
| 55–56 | 1–4 | Spares | |
| 57–64 | 1–4 | CONDITION 2 VALUE #1 | The value to evaluate condition 2, for 64 bit type. |
| 65–72 | 1–4 | CONDITION 2 VALUE #2 | The value to evaluate condition 2 for 32 bit type, or the continuation of a 64 bit type value. |
| 73 | 1 | RATE = 1000 MS | Changes record rate from 100 ms to 1000 ms |
| 73 | 2–4 | Spare | |
| 74–76 | 1–4 | Spare | |
| 77–84 | 1–4 | ADDITIONAL 1 | Address of Additional Parameter #1 to be recorded |
| 85–92 | 1–4 | ADDITIONAL 2 | Address of Additional Parameter #2 to be recorded |
| 93–100 | 1–4 | ADDITIONAL 3 | Address of Additional Parameter #3 to be recorded |
| 101–108 | 1–4 | ADDITIONAL 4 | Address of Additional Parameter #4 to be recorded |
| 109–116 | 1–4 | ADDITIONAL 5 | Address of Additional Parameter #5 to be recorded |
| 117–120 | 1–4 | Spare | |

For example, referring to Table 1, if the character in the second position (character two) had a hexadecimal value such that its binary equivalent would have a "1" in the first position (left most position), then the system is set to record the data from ARINC input bus 1. If for character two the second bit number is also set to "1", the overall hexadecimal value would be a C (bit number of 1100 which is 12 in decimal and a C in hexadecimal) both the "FILTER RX 1" option and the "FILTER ASDB RX 1" option are set. This will enable recording of ARINC 429 input bus 1 with ASDB parameters. The ASDB parameters are preset parameters stored in the database that specify to record the data from the particular input or output and/or what data to record. Bus 1 can be defined to be any input into processor unit 208. The definition of which input is which component is stored in the ASDB, in one embodiment. The actual inputs and outputs to the processor unit 208 can be defined in the supplemental file. Referring to FIG. 4, the most significant bit was given the value of position one although one skilled in art would realize that the most significant bit or least significant bit could be called one and the system indexed from there. The same hold true for the positioning of the characters in the supplemental file 305, the most significant bit could be the nth bit or the first bit is the least significant bit or hexadecimal value.

An exemplary supplemental file is:

"0C80 0000 0000 0000 1000 0000 1500 0000 0000 0000"
"2710 1000 0000 1300 0000 0000 0000 0000 0000 1000"
"0000 0000 0000 2000 0000 0000 0000 0000 0000 0000"

To translate this file the first hexadecimal character is 0 so that one has no effect on the recording. The second hexadecimal character is "C" which has a binary equivalent of 1100. This turns on filter RX1 with filtering done according to the parameters stored in the ASDB. This turns on the recording of input bus 1 according to the ASDB parameters. The supplemental file above request ASDB specifies parameters from ARINC 429 input bus 1 and all parameters on ARINC 429 input bus 3 be recorded. Recording occurs when the radio altitude (the contents of address 1000 0000) is less than 10,000 feet and the aircraft on ground discrete (the contents of address 2000 0000) is false. The recording thus is stopped when the aircraft is on the ground or above an altitude of 10,000 feet. The following table, Table 2, decodes the above supplemental file using Table 1.

TABLE 2

Flight Recording Supplemental File Example

| Character | Value | Name | T²CAS Definition |
|---|---|---|---|
| 1 | 0 | Spare | N/A |
| 2 | C | FILTER RX 1 and 2 | FILTER RX 1 On |
| | | | FILTER ASDB RX 1 On |
| | | | FILTER RX 2 Off |
| | | | FILTER ASDB RX 2 Don't Care. |
| 3 | 8 | FILTER RX 3 and 4 | FILTER RX 3 On |
| | | | FILTER ASDB RX 3 Off |
| | | | FILTER RX 4 Off |
| | | | FILTER ASDB RX 4 Don't Care. |
| 4 | 0 | FILTER RX 5 and 6 | FILTER RX 5 Off |
| | | | FILTER ASDB RX 5 Don't Care |
| | | | FILTER RX 6 Off |
| | | | FILTER ASDB RX 6 Don't Care |

TABLE 2-continued

Flight Recording Supplemental File Example

| Character | Value | Name | T²CAS Definition |
|---|---|---|---|
| 5 | 0 | FILTER RX 7 and 8 | Both FILTER RX's Off, FILTER ASDB RX settings are don't care |
| 6 | 0 | FILTER RX 9 and 10 | Both FILTER RX's Off, FILTER ASDB RX settings are don't care |
| 7 | 0 | FILTER RX 11 and 12 | Both FILTER RX's Off, FILTER ASDB RX settings are don't care |
| 8 | 0 | FILTER RX 13 and 14 | Both FILTER RX's Off, FILTER ASDB RX settings are don't care |
| 9 | 0 | FILTER RX 15 and 16 | Both FILTER RX's Off, FILTER ASDB RX settings are don't care |
| 10 | 0 | FILTER RX 17 and 18 | Both FILTER RX's Off, FILTER ASDB RX settings are don't care |
| 11 | 0 | FILTER AI, FILTER GCAM, FILTER T²CAS, Spare | Each of these FILTERs Off |
| 12 | 0 | FILTER TX 1 FILTER TX 2 FILTER TX 3 FILTER TX 4 | Each of these FILTERs Off |
| 13 | 0 | FILTER D1 FILTER D0 Spare Spare | Each of these FILTERs Off |
| 14–16 | 000 | Spares | Don't Care |
| 17–24 | 1000 0000 | CONDITION 1 ADDRESS | Evaluate the data starting at address 1000 0000 |
| 25 | 1 | CONDITION 1 TYPE | Condition Type = "1"; the translation of this is a 32-bit integer. |
| 26 | 5 | LOGICAL TEST 1 | Test Type = "≦". This indicates an evaluation of the (contents of CONDITION 1 ADDRESS) ≦ (CONDITION 1 VALUE). A TRUE result, when ANDed with a TRUE result of Condition 2 results in recording of data. |
| 27–28 | 00 | Spares | Don't Care |
| 29–36 | 0000 0000 | CONDITION 1 VALUE #1 | Don't care, because Start Condition Type is a 32-bit Integer. |
| 37–44 | 0000 2710 | CONDITION 1 VALUE #2 | Integer value of 10,000. Indicates that the contents of address 1000 0000 will be evaluated for being less than or equal to 10,000. |
| 45–52 | 2000 0000 | CONDITION 2 ADDRESS | Evaluate the data starting at address 2000 0000. It is assumed that the Boolean value is stored in the LSB of this 32-bit word. |
| 53 | 1 | CONDITION 2 TYPE | Condition Type = "1"; the translation of this is a 32-bit Integer for this example of a Boolean evaluation. It is assumed that the raw boolean has been stored as the LSB of a 32-bit word at address 2000 0000. |
| 54 | 3 | LOGICAL TEST 2 | Test Type = "=". This indicates an evaluation of the (contents of CONDITION 2 ADDRESS) = (CONDITION 2 VALUE). A TRUE result, when ANDed with a TRUE result of Condition 1 results in recording of data. |
| 55–56 | 00 | Spares | Don't Care |
| 57–64 | 0000 0000 | CONDITION 2 VALUE #1 | Don't care, because Start Condition Type is a 32-bit Integer |
| 65–72 | 0000 0000 | CONDITION 2 VALUE #2 | Represents a Boolean value of '0' or FALSE. Indicates that the contents of address 2000 0000 will be tested for being equal to FALSE or "0" in the LSB. Note: in general, the FALSE condition is the preferred Boolean to compare to. If the contents of CONDITION 2 ADDRESS are equal to zero (resulting in a TRUE evaluation), and the results of LOGICAL TEST 1 are TRUE, data will be recorded. |
| 73 | 0 | RATE = 1000 MS | Indicates false, which means that rate is 100 msec. |

TABLE 2-continued

Flight Recording Supplemental File Example

| Character | Value | Name | $T^2CAS$ Definition |
|---|---|---|---|
| 74–76 | 000 | Spares | Don't Care |
| 77–84 | 1000 0000 | ADDITIONAL 1 | Contents of Address 1000 0000 to be recorded (32 bits) |
| 85–92 | 0000 0000 | ADDITIONAL 2 | No recording of additional address #2 |
| 93–100 | 2000 0000 | ADDITIONAL 3 | Contents of Address 2000 0000 to be recorded (32 bits) |
| 101–108 | 0000 0000 | ADDITIONAL 4 | No recording of additional address #4 |
| 109–116 | 0000 0000 | ADDITIONAL 5 | No recording of additional address #5 |
| 117–120 | 1–4 | Spare | |

Figure 5:
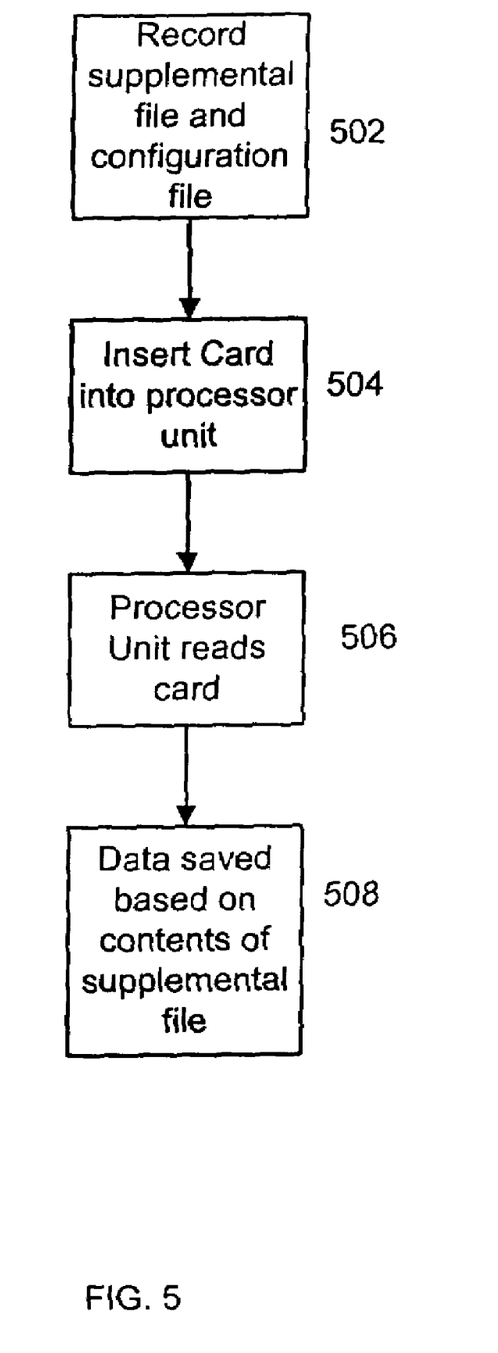
FIG. 5 is a flow chart indicating the use of the present invention.

Referring to FIG. 5, the present invention provides a method for storing information to a memory card. A method for using the present invention is disclosed. In a first step 502, the supplemental file 305 is stored in the memory card 108. This can be done by a user with a computer and a reader/writer for the memory card 108. The user defines what parameters need to be recorded and what other options to activate recording. Based on those values and using the table similar to the one shown in conjunction with FIG. 4, the proper hexadecimal values are stored in the supplemental file 305. Also, the configuration file is stored, indicating if there is a supplemental file 305. After the supplemental file 305 is stored to memory card 108 in step 504, the memory card 108 is inserted into processing unit 102. In step 506, processing unit 102 reads the supplemental file 305 and determines what parameters are to be recorded based on the supplemental file and the table that defining the supplemental file. Then finally in step 508, data is saved to the data file portion 306 of the memory card 108 based on the instructions stored in the supplemental file 305.

One of the advantages of the present invention is that the supplemental file 305 can contain instructions to begin recording of data when certain parameters occur. For example, supplemental file 305 can contain instructions that, when read by processing unit 102, commences recording of data when the aircraft reaches a certain altitude and stops the recording after the aircraft has reached a second altitude. This can be useful in recording only the data needed to troubleshoot a suspected problem. In the present invention, the parameters indicating when to start and stop recording are entered into the supplemental file. For example, the start condition, i.e. what altitude to start recording at, can be entered into the supplemental file as well as the stop condition, i.e. the altitude to stop recording at. Other parameters can also be used to control the recording of data including air speed and the like.

Figure 6:
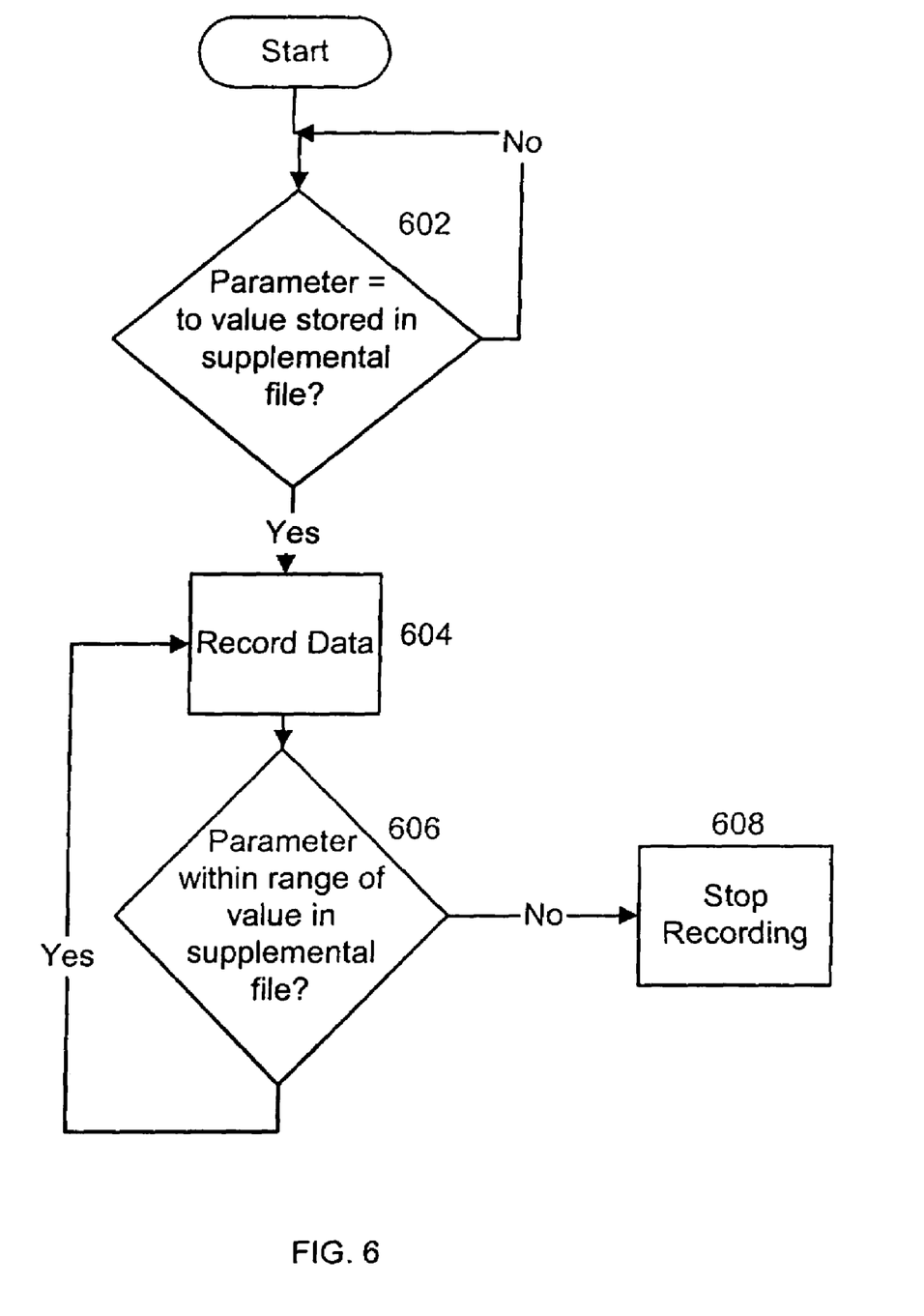
FIG. 6 is a flow chart indicating the use of the present invention to selectively record data.

FIG. 6 illustrates the flow chart illustrating the recording of data based on preset recording conditions. In step 602, processor unit 102 checks to see if the parameter specified in the already read supplemental file 305 (such as altitude) has reached the value specified in the supplemental file 305. If not, no recording occurs and the parameter is checked again in step 602. If the value of the parameter has been reached, then recording to the storage file is activated in step 604. After an amount of data is recorded, i.e. at specified time intervals, the value of the parameter is checked again in step 606 to see if the values of the parameter are still within the values specified in the supplemental file 305 to permit recording. If the value of the parameter falls in to the range to stop recording, then the recording will stop in step 608. If not, recording continues. The present invention is useful to record different conditions at a set parameter value such as conditions occurring at a certain altitude range. Also, the same memory card 108 can be used over a period of time when only recording certain data that occur at certain parameters. Thus, the results of several flights at a certain altitude can be stored in one COMPACTFLASH or similar memory device for analysis.

Having now described preferred embodiments of the invention; modifications and variations to the present invention may be made by those skilled in the art. The invention is thus not limited to the preferred embodiments, but is instead set forth in the following clauses and legal equivalents thereof.

What is claimed is:

1. An apparatus for recording data about a system comprising:
    a memory card comprising a supplemental file and a file storage section;
    a processor unit operable to read from and write to the memory card;
    wherein the supplemental file of the memory card is read by the processor unit, the supplemental file instructing the processor unit what data to save in the file storage section; and
    wherein the supplemental file contains instructions that causes the processor unit to start and stop recording information when certain defined conditions are met.

2. The apparatus of claim 1 wherein the supplemental file of the memory card contains a sequence of hexadecimal characters, the position and bit value of the hexadecimal characters for use in determining information to record.

3. The apparatus of claim 2 wherein a table is used to define the relationship between the sequence of hexadecimal characters and the data to be recorded.

4. The apparatus of claim 1 wherein the certain defined conditions include a predefined aircraft altitude.

5. The apparatus of claim 1 wherein the memory card is removeably inserted into a slot containing a memory card reader/writer located on the processor unit.

6. The apparatus of claim 1 wherein the memory card is a COMPACTFLASH card.

7. The apparatus of claim 1 wherein the supplemental file contains instructions to change the recording rate.

8. The apparatus of claim 1 wherein the supplemental file contains instructions indicating the data from which inputs and outputs of processor units are to be recorded.

9. The apparatus of claim 1 wherein the memory card is a solid-state memory card.

10. The apparatus of claim 1 wherein the supplemental file is blank and a set of default parameters are saved to the memory card.

11. The apparatus of claim 10 wherein the set of default parameters are stored in an aircraft specific database.

12. A memory card for storing test data comprising:
a supplemental file section storing a supplemental file having instructions delineating the data to be recorded;
a file storage area for storing data based on the instructions in the supplemental file; and
wherein the supplemental file contains instructions for starting and stopping recording data when certain predefined conditions are met.

13. The memory card of claim 12, wherein the supplemental file comprises a plurality of hexadecimal characters, the position and bit value of the hexadecimal character for use in determining the data to be recorded.

14. The memory card of claim 13 wherein a table is used to define the relationship between the sequence of hexadecimal characters and the data to be recorded.

15. The memory card of claim 12 wherein the memory card is a solid-state memory card.

16. The memory card of claim 15 wherein the memory card is a COMPACTFLASH card.

17. The memory card of claim 12 wherein the supplemental file contains instructions for changing the recording rate.

18. The memory card of claim 12 wherein the supplemental file contains instructions for overwriting the data stored in the file storage area.

19. The memory card of claim 12 further comprising a header section having a configuration file that indicates if the supplemental file is present.

20. The memory card of claim 12 wherein the memory card is removeably insertable into a slot on a processor unit.

21. The memory card of claim 12 wherein the memory card is for use in an aircraft.

22. A method for recording data concerning a system comprising:
storing a supplemental file on a memory device, the supplemental file containing instructions indicating the data to record;
coupling the memory device to a processor unit;
reading the supplemental file;
storing the data to the memory device; and
wherein the step of storing a supplemental file further comprises storing a supplemental file containing instructions to start and stop recording data when certain defined conditions are met.

23. The method of claim 22 wherein the step of storing a supplemental file further comprises storing a supplemental file comprises a plurality of hexadecimal characters, the position and bit value of the hexadecimal character for use in determining parameters to be recorded.

24. The method of claim 23 further comprising using a lookup table in conjunction with the supplemental file to determine the data to be recorded.

25. The method of claim 22 wherein the defined condition is a predefined aircraft altitude.

26. The method of claim 22 wherein the step of coupling the memory device further comprises removeably inserting the memory device into a slot located on the processor unit.

27. The method of claim 22 wherein the memory device is a COMPACTFLASH card.

28. The method of claim 22 wherein the step of storing a supplemental file further comprises storing a supplemental file containing instructions to change the recording rate.

29. The method of claim 22 wherein the memory card is a solid-state memory card.

30. An apparatus for recording data about a system comprising:
a memory card comprising a supplemental file and a file storage section;
a processor unit operable to read from and write to the memory card;
wherein the supplemental file of the memory card is read by the processor unit, the supplemental file instructing the processor unit what data to save in the file storage section; and
wherein the supplemental file contains instructions to change the recording rate.

31. A memory card for storing test data comprising:
a supplemental file section storing a supplemental file having instructions delineating the data to be recorded;
a file storage area for storing data based on the instructions in the supplemental file; and
wherein the supplemental file contains instructions for changing the recording rate.

32. A memory card for storing test data comprising:
a supplemental file section storing a supplemental file having instructions delineating the data to be recorded;
a file storage area for storing data based on the instructions in the supplemental file; and
wherein the supplemental file contains instructions for overwriting the data stored in the file storage area.

33. A memory card for storing test data comprising:
a supplemental file section storing a supplemental file having instructions delineating the data to be recorded;
a file storage area for storing data based on the instructions in the supplemental file; and
a header section having a configuration file that indicates if the supplemental file is present.

34. A method for recording data concerning a system comprising:
storing a supplemental file on a memory device, the supplemental file containing instructions indicating the data to record;
coupling the memory device to a processor unit;
reading the supplemental file;
storing the data to the memory device;
using a lookup table in conjunction with the supplemental file to determine the data to be recorded; and
wherein storing the supplemental file further comprises storing the supplemental file comprising a plurality of hexadecimal characters, the position and bit value of the hexadecimal characters determining the parameters to be recorded.

35. A method for recording data concerning a system comprising:
storing a supplemental file on a memory device, the supplemental file containing instructions indicating the data to record;
coupling the memory device to a processor unit;
reading the supplemental file;
storing the data to the memory device; and
wherein storing the supplemental file further comprises storing the supplemental file containing instructions to change the recording rate.

* * * * *